(12) United States Patent
Takata

(10) Patent No.: US 10,181,155 B2
(45) Date of Patent: Jan. 15, 2019

(54) EVALUATION DEVICE, EVALUATION METHOD, AND NON-TRANSITORY COMPUTER READABLE STORAGE MEDIUM

(71) Applicant: YAHOO JAPAN CORPORATION, Tokyo (JP)

(72) Inventor: Toru Takata, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 434 days.

(21) Appl. No.: 14/851,990

(22) Filed: Sep. 11, 2015

(65) Prior Publication Data

US 2016/0140656 A1    May 19, 2016

(30) Foreign Application Priority Data

Nov. 14, 2014  (JP) ................................. 2014-232180

(51) Int. Cl.
*G06Q 40/00* (2012.01)
*G06Q 40/02* (2012.01)

(52) U.S. Cl.
CPC ................................. *G06Q 40/025* (2013.01)

(58) Field of Classification Search
CPC .............................................. G06Q 40/00
USPC .......................................................... 705/38
See application file for complete search history.

(56) References Cited

FOREIGN PATENT DOCUMENTS

| JP | 2002-366751 A | 12/2002 |
| JP | 2003-058693 A | 2/2003 |
| JP | 2003-216800 A | 7/2003 |
| JP | 2010-026602 A | 2/2010 |
| JP | 5847915 B1 | 1/2016 |

OTHER PUBLICATIONS

Web-based companies in Japan, there values, and changes in business models. Japan Fair Trade Commission Internet. http://www.jftc.go.jp/cprc/katsudo/bbl.files/163th-bbl.pdf.
Jun. 30, 2015 Office Action issued in Japanese Patent Applicaton No. 2014-232180.
Web-based companies in Japan, there values, and changes in business models. Japan Fair Trade Commission Internet. http://www.jftc.go.jp/cprc/kaysudo/bbl.files/163th-bbl.pdf; Nov. 29, 2013.
Jul. 12, 2016 Office Action issued in Japanese Patent Application No. 2016-088078.

*Primary Examiner* — Kirsten S Apple
(74) *Attorney, Agent, or Firm* — Oliff PLC

(57) ABSTRACT

An evaluation device according to the present application includes an acquisition unit and an evaluation unit. The acquisition unit acquires information related to an enterprise among information which is based on user behavior on a communication network. The evaluation unit evaluates credit of the enterprise based on the information acquired by the acquisition unit. For example, the acquisition unit acquires, as the information which is based on user behavior on the communication network, information transmitted from a user in utilization of a service which is provided by various websites and which is related to the enterprise.

12 Claims, 9 Drawing Sheets

FIG.3

| ENTER-PRISE ID | AGGREGATION PERIOD | NUMBER OF SEARCHES | DEGREE OF INCREASE | SEARCH RANKING | OBJECT WORD |
|---|---|---|---|---|---|
| ⋮ | ⋮ | ⋮ | ⋮ | ⋮ | ⋮ |
| E001 | 2014/11/15_9:00 TO 2014/11/16_9:00 | 2000 | 1000 | 150000 | ENTERPRISE NAME AAA, PRODUCT CCC, PRODUCT DDD, OWNER EEE,… |
| | 2014/11/16_9:00 TO 2014/11/17_9:00 | 4500 | 2500 | 125000 | |
| | 2014/11/17_9:00 TO 2014/11/18_9:00 | 200000 | 195500 | 3500 | |
| | 2014/11/18_9:00 TO 2014/11/19_9:00 | 150000 | ▲50000 | 7500 | |
| | ⋮ | ⋮ | ⋮ | ⋮ | ⋮ |
| E002 | 2014/11/15_9:00 TO 2014/11/16_9:00 | 1200 | 100 | 200000 | ENTERPRISE NAME BBB, PRODUCT FFF, PRODUCT GGG, ABBREVIATION HHH,… |
| | 2014/11/16_9:00 TO 2014/11/17_9:00 | 1300 | 100 | 180000 | |
| | 2014/11/17_9:00 TO 2014/11/18_9:00 | 1000 | ▲300 | 300000 | |
| | 2014/11/18_9:00 TO 2014/11/19_9:00 | 1500 | 500 | 150000 | |
| ⋮ | ⋮ | ⋮ | ⋮ | ⋮ | ⋮ |

| ENTER-PRISE ID | AGGREGATION PERIOD | PV | UU | CVR | ... |
|---|---|---|---|---|---|
| ... | ... | ... | ... | ... | ... |
| E001 | 2014/11/15_9:00 TO 2014/11/16_9:00 | 5000 | 2000 | 0.01 | ... |
| | 2014/11/16_9:00 TO 2014/11/17_9:00 | 8000 | 3000 | 0.01 | ... |
| | 2014/11/17_9:00 TO 2014/11/18_9:00 | 300000 | 220000 | 0.03 | ... |
| | 2014/11/18_9:00 TO 2014/11/19_9:00 | 250000 | 100000 | 0.05 | ... |
| | ... | | | | ... |
| E002 | 2014/11/15_9:00 TO 2014/11/16_9:00 | 2000 | 600 | 0.005 | ... |
| | 2014/11/16_9:00 TO 2014/11/17_9:00 | 2000 | 500 | 0.01 | ... |
| | 2014/11/17_9:00 TO 2014/11/18_9:00 | 1500 | 500 | 0.01 | ... |
| | 2014/11/18_9:00 TO 2014/11/19_9:00 | 3000 | 1200 | 0.02 | ... |
| ... | ... | | | | ... |

| ENTER-PRISE ID | PRODUCT | USER EVALUATION | NUMBER OF REVIEWS | STORE RANKING | ... |
|---|---|---|---|---|---|
| ... | ... | ... | ... | ... | ... |
| E001 | CCC | 4.5 | 4500 | 10 | ... |
| | DDD | 3 | 400 | 1500 | ... |
| | ... | ... | ... | ... | ... |
| E002 | FFF | 4 | 900 | 800 | ... |
| | GGG | 2 | 100 | 6000 | ... |
| | ... | ... | ... | ... | ... |
| ... | ... | ... | ... | ... | ... |

FIG.6

| ENTERPRISE ID | OBJECT OF INVESTIGATION | NUMBER OF CONNECTIONS IN SNS | ... |
|---|---|---|---|
| ... | ... | ... | ... |
| E001 | EEE | 200 | ... |
| | III | 50 | ... |
| | ... | ... | ... |
| E002 | JJJ | 60 | ... |
| | KKK | 10 | ... |
| | ... | ... | ... |
| ... | ... | ... | ... |

124

EVALUATION DEVICE, EVALUATION METHOD, AND NON-TRANSITORY COMPUTER READABLE STORAGE MEDIUM

CROSS-REFERENCE TO RELATED APPLICATION(S)

The present application claims priority to and incorporates by reference the entire contents of Japanese Patent Application No. 2014-232180 filed in Japan on Nov. 14, 2014.

BACKGROUND OF THE INVENTION

1. Field of the Invention

The present invention relates to an evaluation device, an evaluation method, and a non-transitory computer readable storage medium having stored therein an evaluation program.

2. Description of the Related Art

Generally, a financial institution such as a bank determines a credit line with reference to company data provided by a data provider specialized in collecting or analyzing information related to a company. Such company data is generated, for example, based on a statement of accounts (such as financial statement or income statement) of an enterprise. That is, in order to configure credit information used for determination whether a loan amount to each company is appropriate, the financial institution uses company data provided by a business operator.

Here, the following technology is known. That is, along with a recent significant spread of the Internet, information related to a company is shard on the Internet by an information user in addition to conventional information based on a statement of accounts or the like of an enterprise and the shared information is integrally managed, whereby objectivity of company data is increased.

However, in the related technique, credit of an enterprise may not be evaluated accurately. More specifically, in the above related technique, only published financial information of a company, a transaction record of the company which record is known by an information user, information of news in an industry, or the like is shared. Even when such information is integrated, it is difficult to evaluate credit of an enterprise. Thus, an enterprise may not be able to acquire appropriate credit information with which a financial institution calculates a loan amount.

Also, in the related technique, it is difficult to share accurate information of a company which is, for example, an unlisted company or a start-up company and information of which is not easily acquired by an information user. Thus, in the related technique, it can be said that it is difficult to acquire credit information used for determination of a loan condition with respect to an unlisted company or a start-up company.

SUMMARY OF THE INVENTION

It is an object of the present invention to at least partially solve the problems in the conventional technology.

An evaluation device according to the present application includes an acquisition unit configured to acquire information related to an enterprise among information which is based on user behavior on a communication network, and an evaluation unit configured to evaluate credit of the enterprise based on the information acquired by the acquisition unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a view illustrating an example of a search information storage unit according to the embodiment;

FIG. 4 is a view illustrating an example of a site information storage unit according to the embodiment;

FIG. 5 is a view illustrating an example of a product information storage unit according to the embodiment;

FIG. 6 is a view illustrating an example of a social information storage unit according to the embodiment;

DETAILED DESCRIPTION OF THE PREFERRED EMBODIMENTS

In the following, a mode to carry out an evaluation device, an evaluation method, and an evaluation program according to the present application (hereinafter, referred to as "embodiment") will be described in detail with reference to the drawings. Note that the evaluation device, the evaluation method, and the evaluation program according to the present application are not limited to the embodiment. Also, in the following embodiments, the same reference sign is assigned to identical parts and an overlapped description is omitted.

1. Example of Evaluation Processing

Figure 1:
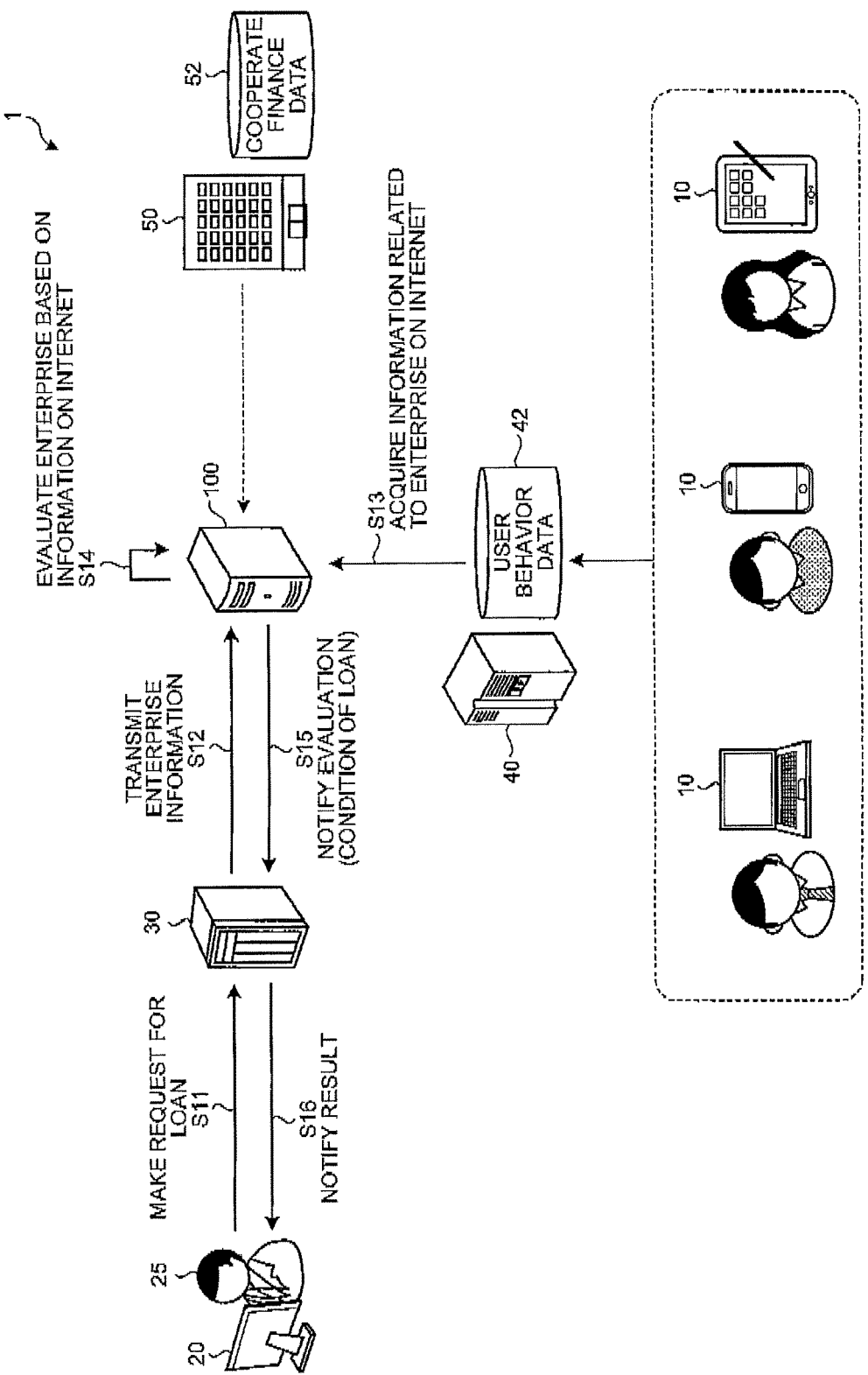
FIG. 1 is a view illustrating an example of evaluation processing according to an embodiment.

First, with reference to FIG. 1, an example of evaluation processing according to an embodiment will be described. FIG. 1 is a view illustrating an example of the evaluation processing according to the embodiment. In FIG. 1, evaluation processing according to the embodiment will be described with an evaluation system 1 as an example. More specifically, in FIG. 1, processing in which an evaluation device 100 included in the evaluation system 1 acquires information, which is related to an enterprise trying to get a loan and is related to behavior of a general user or the like on the Internet, and evaluates credit of an enterprise will be described.

As illustrated in FIG. 1, the evaluation system 1 includes a user terminal 10, an enterprise terminal 20, a financial institution server 30, a web server 40, and the evaluation device 100. The evaluation device 100 is connected to the user terminal 10, the enterprise terminal 20, the financial institution server 30, and the web server 40 through a not-illustrated communication network (such as the Internet) in a communicable manner. Note that the number of user terminals 10, enterprise terminals 20, financial institution servers 30, and web servers 40 which are included in the evaluation system 1 is not limited to the example illustrated in FIG. 1. For example, a plurality of enterprise terminals 20 or a plurality of web servers 40 may be included in the evaluation system 1.

The user terminal 10 is an information processing device used by a general user. More specifically, the user terminal 10 is used by a user to browse a web page or to post an evaluation of product information on a website. The user terminal 10 is, for example, a mobile terminal such as a smartphone, a tablet terminal, or a personal digital assistant (PDA), a desktop personal computer (PC), or a laptop PC. Note that the general user is a user who does not behave according to a specific intention to the evaluation processing of the embodiment. In the embodiment, a company data provider 50 who professionally perform acquisition or analysis of company information or a person who gives loan to an enterprise is excluded from the general user. Also, an enterprise itself may be excluded from the general user but an owner or an individual executive of the enterprise may be included therein.

The enterprise terminal 20 is an information processing device used by an enterprise. More specifically, according to operation by an enterprise 25 to get a loan from a financial institution, the enterprise terminal 20 makes a request for a loan to the financial institution server 30 or receives a result of the request from the financial institution server 30. Here, the enterprise is what runs a business and is, for example, a joint-stock corporation. Note that the enterprise is not limited to a company or an organization and may be a sole proprietor or the like.

The financial institution server 30 is a server device used by a financial institution. More specifically, the financial institution server 30 receives a request for a loan from the enterprise terminal 20 or gives a notification indicating a result of the request to the enterprise terminal 20. Also, the financial institution server 30 uses the evaluation device 100 to evaluate credit of the enterprise 25 when giving the enterprise 25 a loan.

The web server 40 is a server device to provide various web pages when being accessed by the user terminal 10. The web server 40 provides, for example, various web pages related to a news site, a shopping site, a finance (stock price) site, a route search site, a map providing site, a travel site, a restaurant introduction site, or a web log.

Also, the web server 40 stores user behavior on a network. Information of the user behavior is stored as user behavior data 42 into the web server 40 or a predetermined storage device. Here, the user behavior on the network indicates information transmitted from the user terminal 10 according to operation performed by a user in a case of using a service provided by various websites. For example, the user behavior on the network is transmission of a search query on a search site, purchase behavior on a shopping site, or a post of a review on a product evaluation site. Also, the user behavior includes, for example, a message exchange or behavior of following a different person on a social networking service (SNS) site.

The evaluation device 100 is a server device which receives a request for a loan from the enterprise terminal 20 through the financial institution server 30, acquires information related to the enterprise 25, which makes the request, through the Internet, and evaluates credit of the enterprise 25 based on the acquired information. More specifically, the evaluation device 100 acquires behavior information on the Internet (such as evaluation of product provided by enterprise 25, word of mouth, or search information related to enterprise 25 on search service site) which information is transmitted to the web server 40 from the user terminal 10 connected to the Internet. Then, the evaluation device 100 evaluates credit of the enterprise by predicting potential or the like related to management of the enterprise 25 based on the acquired information. In the following, with reference to FIG. 1, a flow of the evaluation processing performed by the evaluation system 1 and the evaluation device 100 will be described.

First, in the example illustrated in FIG. 1, the financial institution server 30 receives a request for a loan from the enterprise terminal 20 (step 311). In this case, generally, it is considered that the financial institution server 30 receives information provided by the company data provider 50 including company information or the like. The company data provider 50 includes cooperate finance data 52 or the like and gives a service of providing company information to a financial institution or the like. The company data provider 50 includes, for example, a capital adequacy ratio, stock information, real estate information, or the like of a company. Based on the information provided by the company data provider 50, the financial institution or the like determines credit of the enterprise 25, which makes a request for a loan, and determines a loan amount.

Here, information related to the enterprise 25 which makes a request to the financial institution server 30 for a loan may not be held by the company data provider 50 or may not be enough for determination of a loan. For example, there is a case where the company data provider 50 does not have useful company information or a case where information related to the enterprise 25 is not adequate or recognizable since the enterprise 25 is an unlisted company, small business, or a new company which is just established. In such a case, a lender such as a financial institution cannot determine credit of the enterprise 25 which makes a request for a loan. Thus, the enterprise 25 may not be able to get a loan.

Thus, the financial institution server 30 uses the evaluation device 100 to grasp credit information of the enterprise 25, that is, credit of the enterprise 25 to be supported financially. In this case, the financial institution server 30 transmits enterprise information related to the enterprise 25 to the evaluation device 100 (step S12). Accordingly, the evaluation device 100 specifies the enterprise 25 which is received by the financial institution server 30 and acquires information related to the enterprise 25.

Even when company information is not provided by the company data provider 50 or when provided information is not adequate, the evaluation device 100 evaluates credit of the enterprise based on information different from the information provided by the company data provider 50. For example, the evaluation device 100 acquires information related to the enterprise 25 on the Internet (step S13). That is, the evaluation device 100 acquires, among the information related to the enterprise 25, information which is based on user behavior on the Internet and which can be acquired through the Internet. More specifically, the evaluation device 100 acquires, from the user behavior data 42, information related to the number of times of search behavior performed by the user terminal 10 with a name of the enterprise 25 or a name of a product provided by the enterprise 25 as a search query, the number of visits on a website provided by the enterprise 25, or a post of a review with respect to the product provided by the enterprise 25.

Then, based on the acquired information, the evaluation device 100 evaluates credit for determination of a loan condition to the enterprise 25 (step S14). For example, the more search behavior related to the enterprise 25 is performed by the user terminal 10, the higher the evaluation device 100 values credit of the enterprise 25. That is, when the number of searches of a word related to the enterprise 25 performed by the general user is large, the evaluation device 100 assumes that a degree of attention of the general user to the enterprise 25 is high and that business continuity is well and values the credit of the enterprise 25 highly. Similarly, the evaluation device 100 evaluates credit of the enterprise 25 based on the number of visits by the user terminal 10 on a website provided by the enterprise 25 or the number of posted reviews or an evaluation value with respect to the product provided by the enterprise 25. For example, based on an increase in the number of visits on the website or based on the number of posts of reviews or high evaluation with respect to the product, the evaluation device 100 assumes that possibility of growth of the enterprise 25 is high and highly values credit of the enterprise 25.

Then, the evaluation device 100 notifies evaluation with respect to the enterprise (such as detailed loan condition) to the financial institution server 30 (step S15). Then, based on the evaluation with respect to the enterprise 25 which evaluation is notified by the evaluation device 100, the financial institution server 30 gives the enterprise terminal 20 notification indicating a result of the request for a loan (step S16).

In such a manner, the evaluation device 100 according to the embodiment acquires information, which is related to the enterprise, among the information based on the user behavior on the Internet. Then, the evaluation device 100 evaluates credit of the enterprise based on the acquired information.

Accordingly, the evaluation device 100 according to the embodiment can evaluate the credit of the enterprise 25 without depending on financial information or the like of a company which information is generally used for determination of a loan condition. Thus, according to the evaluation device 100, even an unlisted company or a new company which is generally difficult to get a loan from the financial institution or the like can get a loan. Also, the evaluation device 100 evaluates credit of the enterprise 25, to which a loan is to be given, based on information including a great number of samples by acquiring information related to user behavior on the Internet. Thus, since the evaluation device 100 can determine a loan condition based not only on published financial information but also on behavior information of many general users, a loan can be given accurately. That is, since the credit of the enterprise 25 can be evaluated accurately according to the evaluation device 100, reliable credit information can be provided. Note that credit evaluated by the evaluation device 100 is not necessarily used for financial support and may be also used, for example, for various kinds of commercial behavior by the enterprise (such as credit as advertiser to distribute advertisement or credit as member store of shopping site).

2. Configuration Evaluation Device

Figure 2:
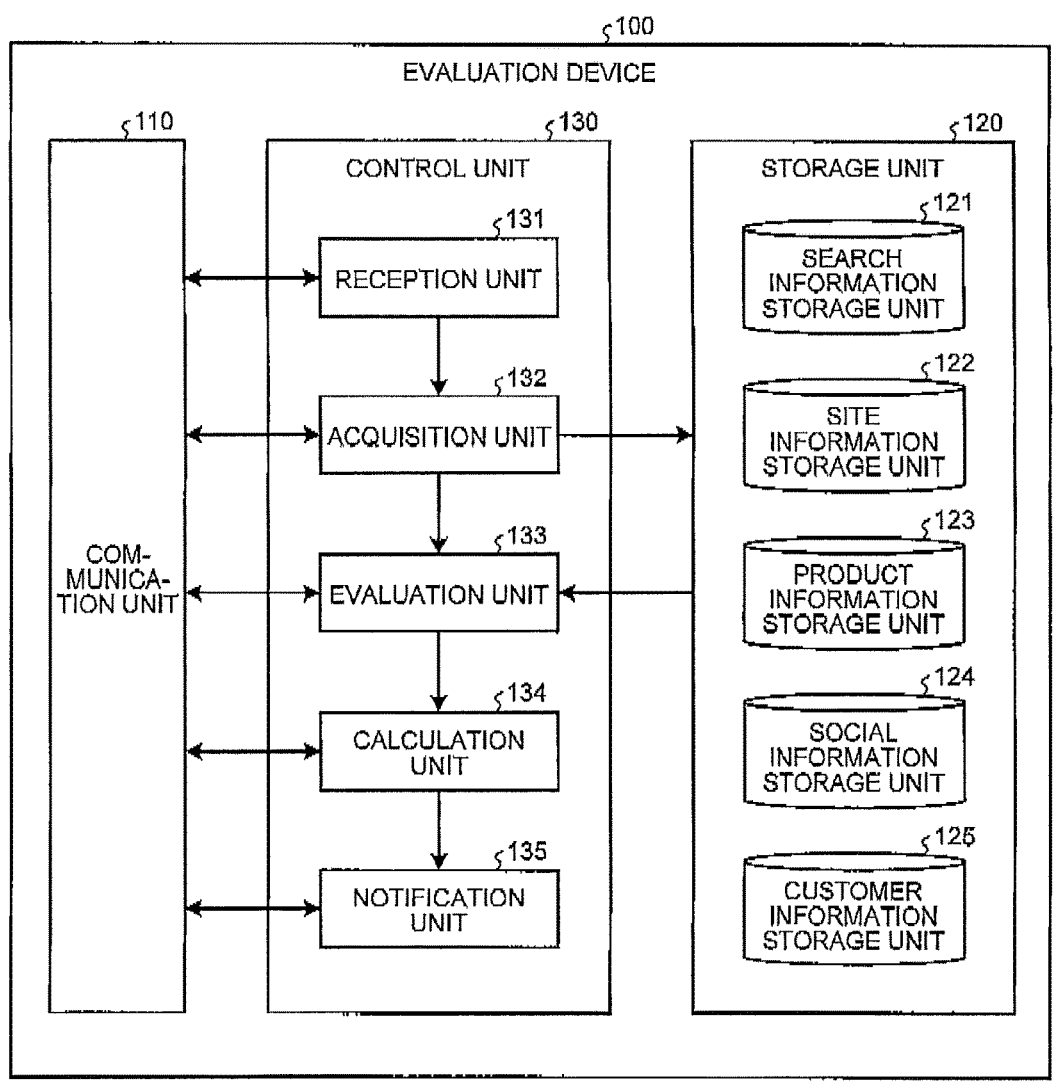
FIG. 2 is a view illustrating a configuration example of an evaluation device according to the embodiment.

Next, with reference to FIG. 2, a configuration of the evaluation device 100 according to the embodiment will be described. FIG. 2 is a view illustrating a configuration example of the evaluation device 100 according to the embodiment. As illustrated in FIG. 2, the evaluation device 100 includes a communication unit 110, a storage unit 120, and a control unit 130. Note that the evaluation device 100 may include an input unit (such as keyboard or mouse) to receive various kinds of operation by an administrator or the like who uses the evaluation device 100 or a display unit (such as liquid crystal display) to display various kinds of information.

Communication Unit 110

The communication unit 110 is realized, for example, by a network interface card (NIC). Such a communication unit 110 is connected to the communication network in a wired or wireless manner and transmits/receives information to/from the user terminal 10, the enterprise terminal 20, or the like through the communication network.

Storage Unit 120

The storage unit 120 is realized, for example, by a semiconductor memory element such as a random access memory (RAM) or a flash memory, or a storage device such as a hard disk or an optical disk. The storage unit 120 according to the embodiment includes a search information storage unit 121, a site information storage unit 122, a product information storage unit 123, a social information storage unit 124, and a customer information storage unit 125. In the following, each storage unit will be described in order.

Search Information Storage Unit 121

The search information storage unit 121 stores information related to search behavior of a user on the Internet. Here, in FIG. 3, an example of the search information storage unit 121 according to the embodiment is illustrated. As illustrated in FIG. 3, the search information storage unit 121 includes items such as an "enterprise ID," an "aggregation period," the "number of searches," a "degree of increase," a "search ranking," and an "object word."

The "enterprise ID" indicates identification information to identify an enterprise to be an evaluation object of the evaluation device 100. The "aggregation period" indicates a period of aggregating search behavior of the user terminal 10. In the example illustrated in FIG. 3, the aggregation period is in a day unit. However, the aggregation period may be a different period. For example, by setting the aggregation period as one week, the evaluation device 100 can grasp a tendency of a search in a longer period of time.

For example, the "number of searches" indicates the number of times the enterprise is searched for by a search engine on a predetermined search site. Note that as described later, a search query which is counted as the number of searches for each enterprise is not limited to a name of the enterprise and may include a name of a product provided by the enterprise or a name of an owner of the enterprise.

The "degree of increase" indicates an increased/decreased value of the number of searches with respect to the number of searches in a previous aggregation period. The "search ranking" indicates ranking of the number of searches in a predetermined search site. Note that an item of the search ranking is not limited to raking based on the number of searches. Ranking based on a degree of increase may be stored although not illustrated.

The "object word" is a word counted as the number of searches related to the enterprise in a case where the described word is transmitted as a search query. For example, when a name of a product provided by the enterprise is more popular than a name of the enterprise, it is considered that the user performs search behavior based on the name of the product. Even in a case where a search is performed with the name of the product as a search query, when the name of the product is set as an object word, the number of searches with respect to the enterprise providing the product is counted. The object word may be set by an administrator of the evaluation device 100 or according to an application from the enterprise. Also, for example, the object word may be set automatically by analyzing a link of a website based on a search result. That is, when a search for a "product CCC" is performed and many websites related to an "enterprise name AAA" are displayed as the search results, the "product CCC" is automatically set as an object word along with the enterprise name AAA.

That is, in FIG. 3, the following is indicated as an example of data. That is, a search for an enterprise identified by an enterprise ID "E001" is performed for "2000 times" in an aggregation period between "9:00 on Nov. 15, 2014 to 9:00 on Nov. 16, 2014," a degree of increase from the previous number of searches is "1000 times," and search ranking is "150000th." Also, it is indicated that the "enterprise name AAA," the "product CCC," a "product DDD," an "owner EEE" and the like are set as object words in a search with respect to the enterprise identified by the enterprise ID "E001." Also, a search for the enterprise identified by the enterprise ID "E001" is performed for "200000 times" in an aggregation period between "9:00 on Nov. 17, 2014 to 9:00 on Nov. 18, 2014" and the number of searches is increased for "195500 times." In this case, it can be assumed that an event which causes a sudden increase in popularity of the enterprise identified by the enterprise ID "E001" has happened. With respect to such a sudden increase, a sign which can be recognized as a focused company may be automatically stored in the search information storage unit 121.

Site Information Storage Unit 122

The site information storage unit 122 shares information related to a website operated or managed by the enterprise. Here, in FIG. 4, an example of the site information storage unit 122 according to the embodiment is illustrated. As illustrated in FIG. 4, the site information storage unit 122 includes items such as an "enterprise ID," an "aggregation period," a "ET," a "UU," and a "CVR."

The "enterprise ID" and the "aggregation period" respectively correspond to identical items stored in the search information storage unit 121. The "PV" indicates a page view on a website, that is, the number of views.

The "UU" indicates the number of unique users. The unique user indicates the number of people who visit a website. Even when the same user visits the same website for a plurality of times, the number of UU is counted as "1."

The "CVR" indicates a conversion rate. The CVR indicates a rate of conversion with respect to the number of views of a website. The conversion indicates a final result which can be acquired on a website. For example, the conversion is purchase of a product on an on-line shopping site or a member registration or a brochure request on an information providing site or a community site. Note that as the CVR, a conversion rate with respect to the number of views or a conversion rate with respect to the unique user may be employed.

That is, in FIG. 4, the following is indicated as an example of data. That is, a website provided by the enterprise identified by the enterprise ID "E001" is viewed for "5000 times" in an aggregation period between "9:00 on Nov. 15, 2014 to 9:00 on Nov. 16, 2014," the number of UU who browse the site is "2000," and "one percent" of the number of views reaches the conversion.

Note that the aggregation period in FIG. 4 is an example and the PV or the like may be aggregated not in a day unit but in a week unit or a month unit. Also, each item such as the PV is not limited to a numeric value which is an absolute number. The number of variations from the previous aggregation period may be aggregated.

Product Information Storage Unit 123

The product information storage unit 123 stores information related to a product provided by an enterprise. Here, in FIG. 5, an example of the product information storage unit 123 according to the embodiment is illustrated. As illustrated in FIG. 5, the product information storage unit 123 includes items such as an "enterprise ID," a "product," a "user evaluation," the "number of reviews," and "store ranking."

The "enterprise ID" corresponds to a similar item stored in the search information storage unit 121. The "product" indicates a name of a product provided by the enterprise.

The "user evaluation" indicates an evaluation value by a general user on a product evaluation site on the Internet. The product evaluation site is a communication site to receive information of a word of mouth which information is, for example, a review or evaluation of a product from the general user. Also, when a product provided by the enterprise is an application for a terminal, a site to provide a download service of an application (which site is called application store or the like) may also function as a product evaluation site. Here, it is assumed that the user evaluation is indicated by an average of numeric values from "0" to "5" transmitted from users.

The "number of reviews" indicates the number of reviews posted by a user on a product evaluation site on the Internet. The "store ranking" indicates ranking among similar products dealt on the product evaluation site. For example, the store ranking corresponds to a product with the highest user evaluation. Also, as described above, when the product evaluation site is an application store, the store ranking may be the number of downloads of the application.

That is in FIG. 5, as an example of data, it is indicated that a user evaluation of a product "CCC" provided by an enterprise identified by an enterprise ID "E001" is "4.5 points," the number of posted reviews is "4500," and store ranking is "10th."

Social Information Storage Unit 124

The social information storage unit 124 stores an index value for evaluation of a social reputation or attractiveness of an enterprise. Here, in FIG. 6, an example of the social information storage unit 124 according to the embodiment is illustrated. As illustrated in FIG. 6, the social information storage unit 124 includes items such as an "enterprise ID," an "object of investigation," and the "number of connections in an SNS."

The "enterprise ID" corresponds to a similar item stored in the search information storage unit 121. The "object of investigation" indicates an individual name to be an object of social analysis in an enterprise identified by an enterprise ID. For example, the object of investigation corresponds to a president or an executive such as a director of the enterprise.

The "number of connections in an SNS" indicates, when the object of investigation uses an SNS, the number of other people connected in the SNS. For example, the number of followers in an SNS or the like is indicated.

That is, in FIG. 6, as an example of data, it is indicated that an object of investigation in the enterprise identified by the enterprise ID "E001" is "EEE" and that the number of connections in the SNS used by the "EKE" is "200."

Customer Information Storage Unit 125

Figure 7:
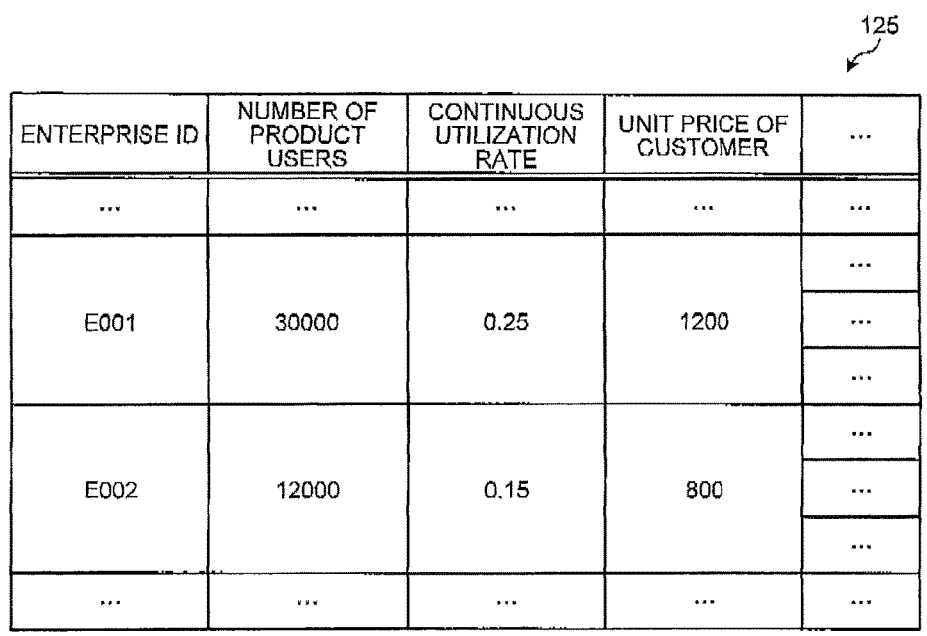
FIG. 7 is a view illustrating an example of a customer information storage unit according to the embodiment.

The customer information storage unit 125 stores information related to a customer of an enterprise. Here, in FIG. 7, an example of the customer information storage unit 125 according to the embodiment is illustrated. As illustrated in FIG. 7, the customer information storage unit 125 includes items such as an "enterprise ID," the "number of product users," a "continuous utilization rate," and a "unit price of a customer."

The "enterprise ID" corresponds to a similar item stored in the search information storage unit 121. The "number of product users" indicates the number of customers using a product provided by an enterprise identified by an enterprise ID. For example, when a product provided by the enterprise is an application, the total number of downloads of the application provided by the enterprise is indicated.

The "continuous utilization rate" indicates a continuous utilization rate of a customer with respect to the enterprise. For example, when the enterprise operates a shopping site on the Internet, a rate of the number of users periodically using the site among the number of all users browsing the side is indicated. Also, when the enterprise provides an application, a continuous utilization rate may be a rate of the number of terminals, utilization with which is continuously checked, among the total number of downloads. In this case, the continuous utilization rate is stored as an operation rate of the application (such as value which is the number of users in predetermined period divided by the number of users performing download).

The "unit price of a customer" indicates a unit price spent by each customer of the enterprise. For example, when the enterprise provides a shopping site, a unit price of a customer corresponds to a purchased amount of each user. Also, when the enterprise provides an application, a unit price of a customer may be calculated by a sales amount in download or a cost necessary for continuous utilization of an application.

That is, in FIG. 7, as an example of data, it is indicated that the number of users of a product provided by the enterprise identified by the enterprise ID "E001" is "30000," a continuous utilization rate is "0.25," and a unit price of a customer is "1200 yen."

Control Unit 130

The control unit 130 is realized, for example, when a central processing unit (CPU) or a micro processing unit (MPU) executes, with a RAM as a working area, various programs (corresponding to example of search program) stored in a storage device in the evaluation device 100. Also, the control unit 130 is realized, for example, by an integrated circuit such as an application specific integrated circuit (ASIC) or a field programmable gate array (FPGA).

As illustrated in FIG. 2, the control unit 130 according to the embodiment includes a reception unit 131, an acquisition unit 132, an evaluation unit 133, a calculation unit 134, and a notification unit 135 and realizes or executes a function or an effect of information processing described later. Note that an inner configuration of the control unit 130 is not limited to the configuration illustrated in FIG. 2 and may be a different configuration as long as information processing described later is performed. Also, a connection relation between processing units included in the control unit 130 is not limited to the communication relation illustrated in FIG. 2 and may be a different communication relation.

Reception Unit 131

The reception unit 131 receives a request related to evaluation of an enterprise. More specifically, the reception unit 131 according to the embodiment receives a request related to evaluation of the enterprise from the financial institution server 30 which receives a request for a loan from the enterprise. In this case, the reception unit 131 receives information related to the enterprise along with the request. For example, the reception unit 131 receives a name of the enterprise, product information provided by the enterprise, an industry of the enterprise, information related to an owner or an executive, or the like. Note that when the product information provided by the enterprise or the information related to an owner or an executive is not received by the financial institution server 30 and these pieces of information are not received from the financial institution server 30, the reception unit 131 may receive information from a different server (such as web server 40). Then, the reception unit 131 transmits the received information to the acquisition unit 132.

Acquisition Unit 132

The acquisition unit 132 acquires information related to an enterprise among information which is based on a user behavior on a communication network (such as Internet). More specifically, based on the information received by the reception unit 131, the acquisition unit 132 according to the embodiment specifies an enterprise to be evaluated and searches the Internet for information related to the specified enterprise. Then, the acquisition unit 132 acquires, from the web server 40, information transmitted from a user in utilization of a service, which is provided by various websites and which is related to the enterprise, as information which is based on user behavior on the Internet. Note that information based on user behavior on the Internet indicates information generated along with utilization of a service performed by a user on various websites, the utilization being, for example, transmission of a search query performed by a user on a search site, post of a review of a product performed by a user on a product evaluation site, or provision of information performed by a user in an SNS. Also, a service related to an enterprise is not limited to a service such as a shopping site directly provided by an enterprise and may include, for example, a service on a search site on which a search for the enterprise can be performed or a service on an evaluation site on which a product of the enterprise can be evaluated.

For example, the acquisition unit 132 acquires search information related to the enterprise on a predetermined search site. More specifically, the acquisition unit 132 acquires search information indicating, for example, how many times a search for the enterprise is performed by a user with a search query related to the enterprise as an object word of a search. Then, the acquisition unit 132 stores the acquired information into the search information storage unit 121.

Also, the acquisition unit 132 acquires site information on a website provided by an enterprise information of which is to be acquired. More specifically, the acquisition unit 132 acquires information such as the number of PVs, the number of UUs, or a CVR of a website provided by the enterprise. Then, the acquisition unit 132 stores the acquired information into the site information storage unit 122.

Also, the acquisition unit 132 acquires information related to a product provided by the enterprise information of which is to be acquired. More specifically, the acquisition unit 132 acquires information such as a user evaluation, the number of reviews, or store ranking on the Internet of the product provided by the enterprise. Note that the acquisition unit 132 may acquire information related to a trend of each piece of information (that is, rate of variation) such as variation in a user evaluation or variation in store ranking. Also, when a product provided by the enterprise is a program product such as an application, the acquisition unit 132 acquires an index value such as the number of downloads of the application, the number of users, average utilization time of each user, or an operation rate of the application in a predetermined period. Then, the acquisition unit 132 stores the acquired information into the product information storage unit 123.

Also, the acquisition unit 132 acquires information for evaluation of social reputation or attractiveness of the enterprise information of which is to be acquired. More specifically, the acquisition unit 132 acquires information such as the number of connections, in an SNS, of an owner or an executive of the enterprise. Note that the acquisition unit 132 may acquire action of an owner on the Internet as an index value for evaluation of social reputation or attractiveness of the enterprise. For example, the acquisition unit 132 acquires information (such as popularity or size of operating company) of a person personally connected to the owner in the SNS. That is, the acquisition unit 132 also acquires, for example, information which is assumed to indicate personal connection of the owner. For example, the acquisition unit 132 acquires the number of accesses by a general user or the number of followers, in the SNS, of the owner or the individual executive of the enterprise as information related to popularity or reputation of the owner or the individual executive of the enterprise. Then, the acquisition unit 132 stores the acquired information into the social information storage unit 124.

Also, the acquisition unit 132 acquires information related to a customer of the enterprise information of which is to be acquired. More specifically, the acquisition unit 132 acquires information such as the number of users of a product provided by the enterprise, a continuous utilization rate of the user, or a unit price of a customer. For example, with respect to an enterprise which provides an application, the acquisition unit 132 can acquire the number of product users by acquiring the number of downloads of an application or the like from an application store. Also, with respect to an enterprise operating a shopping site, the acquisition unit 132 can acquire information related to a continuous utilization rate or a unit price of a customer based on intervals of visiting a site and a purchase amount of a user. Then, the acquisition unit 132 stores the acquired information into the customer information storage unit 125.

Note that the acquisition unit 132 can continually acquire not only information related to an enterprise from which a request for a loan is received but also information related to a different enterprise (such as fellow trader of enterprise from which request for loan is received) by crawling on the Internet. For example, by using a program such as a search robot used for a search engine, the acquisition unit 132 can continually acquire information related to the enterprise or can update the acquired information.

Evaluation Unit 133

The evaluation unit 133 evaluates credit of an enterprise based on various kinds of information. More specifically, based on information acquired by the acquisition unit 132, the evaluation unit 133 according to the embodiment evaluates credit for determination of a loan condition with respect to the enterprise.

That is, in order to determine an appropriate loan condition with respect to an enterprise from which a request for a loan is received, the evaluation unit 133 provides credit information of the enterprise by evaluating credit of the enterprise based on the information on the Internet which information is acquired by the acquisition unit 132. For example, based on the information acquired by the acquisition unit 132, the evaluation unit 133 evaluates credit of the enterprise from points of a probability of bankruptcy, a repayment capacity, business continuity, growth potential, and the like of the enterprise. As an example of evaluation, the evaluation unit 133 can employ a method of evaluating a score of each point and expressing credit of the enterprise in a numeric form with the sum of the scores of the points.

For example, the evaluation unit 133 evaluates credit according to the number of responses transmitted from a user with respect to the enterprise. More specifically, the evaluation unit 133 highly values credit of an enterprise, a search for which is performed for a great number of times, by assuming that a degree of attention from a general user is high. Also, by highly calculating an expectation value of growth potential of the enterprise with a rate of variation in the number of searches, a sudden increase in the number of searches, or the like as an evaluation object, the evaluation unit 133 highly values credit of the enterprise.

Also, when the number of PVs of a website provided by the enterprise becomes larger, the evaluation unit 133 assumes that a degree of attention from a general user is high and highly values credit of the enterprise. However, when the number of PVs of a website is increased suddenly, the evaluation unit 133 may values credit of the enterprise highly or lowly. For example, the number of PVs of a website may vary suddenly not only by a positive material (in case of being reported as news of development of remarkable product or the like) but also by a negative material (such as report as news of exposure of fraud). In this case, the evaluation unit 133 can value credit highly or lowly by determining a positive nature or a negative nature of a material which influences the number of PVs. Such determination may be performed manually by an administrator of the evaluation device 100 or may be performed automatically by analysis of a term in an article of news.

Also, the evaluation unit 133 evaluates credit of the enterprise by using an analysis of product information, an analysis according to a social relation of the enterprise, or an analysis of a customer. For example, in a point of business continuity or growth potential, the evaluation unit 133 highly values credit of an enterprise which provides a product highly valued by a user. More specifically, the evaluation unit 133 evaluates a degree of credit of the enterprise based on a value stored in an item such as a user evaluation, the number of reviews, or store ranking in the product information storage unit 123 illustrated in FIG. 5. Also, when a product provided by the enterprise is an application, the evaluation unit 133 evaluates a degree of credit of the enterprise based on the number of downloads of the application, the number of users, average utilization time of each user, an operation rate in a predetermined period, or a rate of variation of these numeric values in a predetermined period. Also, when a personal connection or popularity of an owner or an executive of the enterprise is well (for example, when there is connection, in SNS, with person assumed to have influence on specific industry or when the number of accesses from general user or the number of followers of owner or individual executive of enterprise is relatively large in SNS), the evaluation unit 133 highly values credit of the enterprise. Also, based on the number of product users, a continuous utilization rate, or a unit price of a customer stored in the customer information storage unit 125 illustrated in FIG. 7, the evaluation unit 133 may determine a probability of bankruptcy or a repayment capacity of the enterprise and may evaluate a degree of credit of the enterprise.

Note that when it is possible to receive, from the company data provider 50, company information of an enterprise to be evaluated, the evaluation unit 133 may also use the information for evaluation of credit. Accordingly, since the evaluation unit 133 can add information such as an actual financial condition of the enterprise to an evaluation criterion in addition to information based on user behavior on the Internet, credit can be evaluated more accurately.

Also, the evaluation unit 133 may evaluate credit of an enterprise to be evaluated based on reputation of a fellow trader or a condition of an industry. For example, when an index value such as a management condition or sales of a product of a fellow trader or a whole industry is increased, the evaluation unit 133 may highly value credit of an enterprise which belongs to the same industry. More specifically, with respect to an application for a terminal or the like, there is a case where applications with similar functions become popular. In this case, in consideration of growth potential of an enterprise which provides a popular application, the evaluation unit 133 may highly values credit of the enterprise.

Calculation Unit 134

The calculation unit 134 calculates a condition related to a loan for an enterprise. More specifically, based on credit of the enterprise which credit is evaluated by the evaluation unit 133, the calculation unit 134 according to the embodiment determines whether a loan can be given to the enterprise and calculates a specific loan amount to the enterprise.

For example, the calculation unit 134 determines that a loan can be given to an enterprise with the credit evaluated by the evaluation unit 133 being equal to or larger than a certain value. Then, when a loan can be given, the calculation unit 134 calculates a loan amount with respect to the enterprise. For example, when the reception unit 131 receives a requested loan amount from the enterprise, the calculation unit 134 calculates a financeable amount by multiplying the requested loan amount by a predetermined rate calculated from credit of the enterprise. Note that the calculation unit 134 may calculate a financeable amount without considering a loan amount requested by the enterprise. Also, when there is a record of a loan given to a different company in the same business with an enterprise which requests a loan, the calculation unit 134 may calculate a financeable amount based on the record.

Notification Unit 135

The notification unit 135 notifies a response to a received request. More specifically, to the financial institution server 30, the notification unit 135 according to the embodiment notifies whether a loan can be given to (or loan should be given to) an enterprise which is an evaluation object or notifies a financeable amount calculated by the calculation unit 134 with respect to a request from the financial institution server 30 which request is received by the reception unit 131.

3. Processing Procedure

Figure 8:
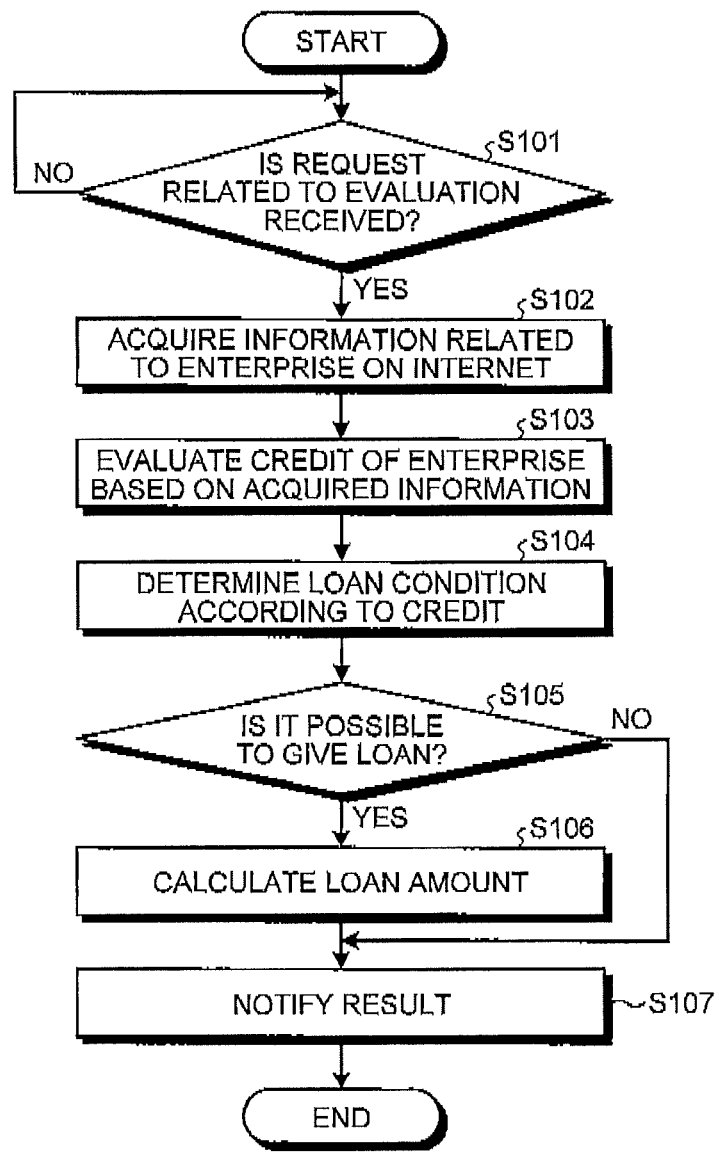
FIG. 8 is a flowchart illustrating an evaluation processing procedure performed by the evaluation device according to the embodiment.

Next, with reference to FIG. 8, a procedure of evaluation processing performed by the evaluation device 100 according to the embodiment will be described. FIG. 8 is a flowchart illustrating an evaluation processing procedure by the evaluation device 100 according to the embodiment.

As illustrated in FIG. 8, the reception unit 131 according to the evaluation device 100 determines whether a request related to evaluation of an enterprise is received from the financial institution server 30 (step S101). When the request is not received (step S101; No), the reception unit 131 waits until the request is received.

On the other hand, when the request is received (step S101; Yes), the reception unit 131 transmits information of the enterprise related to the request to the acquisition unit 132. Then, the acquisition unit 132 acquires information related to the enterprise on the Internet (step S102). Then, the evaluation unit 133 evaluates credit of the enterprise based on the information acquired by the acquisition unit 132 (step S103).

Then, the calculation unit 134 determines a loan condition according to the credit evaluated by the evaluation unit 133 (step S104). First, the calculation unit 134 determined whether a loan can be given to the enterprise (step S105). When it is determined that a loan cannot be given (step S105; No), the calculation unit 134 does not execute calculation of a loan amount.

On the other hand, when it is determined that a loan can be given (step S105; Yes), the calculation unit 134 calculates a loan amount with respect to the enterprise (step S106). Then, the notification unit 135 notifies a result such as a loan condition to the financial institution server 30 (step S107).

4. Modification Example

The evaluation device 100 according to the above-described embodiment may be performed not only in the above-described embodiment but also in various different embodiments. Thus, in the following, a different embodiment of the evaluation device 100 will be described.

4-1. Utilization of Information of Related Person

In the above-described embodiment, an example in which the evaluation device 100 evaluates credit of an enterprise based on information related to popularity, a personal connection, or the like of an owner or an executive of the enterprise has been described. Here, for example, the evaluation device 100 may further acquire information from an SNS or the like used by an owner or an individual executive of an enterprise and may use the information for evaluation of credit of the enterprise.

For example, the acquisition unit 132 acquires, from the SNS, information related to purchasing behavior of the owner or the individual executive of the enterprise. In this case, among information transmitted from the owner or the individual executive to the SNS, the acquisition unit 132 acquires information indicating that the owner or the individual executive purchases a relatively expensive product or performs investing activity frequently. Then, the evaluation unit 133 evaluates credit of the enterprise based on the acquired behavior information of the owner or the individual executive. For example, when purchasing behavior or investing activity of the owner or the individual executive is performed frequently, the evaluation unit 133 determines that a management condition of the enterprise is good and highly values credit of the enterprise. Alternatively, when the purchasing behavior or investing activity which has been performed frequently is decreased extremely, the evaluation unit 133 determines that a management condition of the enterprise may not be good and values credit of the enterprise lowly. Accordingly, even when it is not possible to acquire information related to a financial condition of the enterprise, the evaluation device 100 can evaluate credit of the enterprise.

Also, the acquisition unit 132 may acquire information of an individual assumed to have a connection in an SNS used by the owner or the individual executive of the enterprise (individual connected in SNS). For example, the acquisition unit 132 acquires information such as a position of an individual connected to the owner or the individual executive of the enterprise, a size or a management condition of a company related to the individual, popularity or a personal connection of the individual, or a previous position of the individual. Based on the number of people connected to the owner or the individual executive of the enterprise or the information of each person, the evaluation unit 133 determines a personal connection of the owner or the individual executive of the enterprise. Then, the evaluation unit 133 evaluates a degree of credit of the enterprise based on the determined personal connection of the owner or the individual executive of the enterprise. In such a manner, the evaluation device 100 can measure growth potential of the enterprise by determining a personal connection of a person related to the enterprise and can evaluate credit of the enterprise based on the growth potential.

Also, among information output in the SNS used by the owner or the individual executive of the enterprise, the acquisition unit 132 may acquire information related to trend in human resources of the enterprise. For example, the acquisition unit 132 acquires information related to recruitment or job turnover in the enterprise. Then, when the information related to recruitment or job turnover in the enterprise is output frequently, the evaluation unit 133 can determine that business continuity of the enterprise is not clear and can value credit of the enterprise lowly. On the other hand, when information related to recruitment and an increase in a size of the enterprise are observed in a long period of time, the evaluation unit 133 can assume that growth potential of the enterprise is promised and can value credit of the enterprise highly. Note that information related to the SNS which information is acquired by the acquisition unit 132 is not limited to that of the owner or the executive of the enterprise. For example, when the enterprise is a company, an employee of the enterprise may be included. Also, when the enterprise is an organization, a member of the organization may be included.

Also, the acquisition unit 132 can employ a method of previously registering a word or the like assumed to be an index of evaluation with respect to information output on the Internet such as the SNS and of automatically collecting information from the SNS. Also, the acquisition unit 132 can accurately acquire information to be an index of evaluation by updating a previously-registered word by machine learning.

4-2. Fellow Trader

In the above-described embodiment, it is indicated that the evaluation device 100 can continually acquire not only information related to an enterprise from which a request for a loan is received but also information related to a different enterprise (such as fellow trader of enterprise from which request for loan is received). Here, the evaluation device 100 may evaluate credit of an enterprise, from which a request for a loan is received, by using information related to a fellow trader of the enterprise from which a request for a loan is received.

There is a case where company information provided by the company data provider 50 or information related to an enterprise on the Internet is not accumulated for an amount enough for evaluation of credit with respect to a new company or a small enterprise. In this case, the evaluation device 100 may not be able to evaluate credit of the enterprise accurately. Thus, the acquisition unit 132 acquires information related to a size of a business, a product, a business development, a unit price of a customer, or the like of a fellow trader which is a fellow trader of an enterprise from which a request for a loan is received and information of which is accumulated for a certain amount. Also, the acquisition unit 132 acquires information related to a record of business continuity, a recent business condition, or the like of the fellow trader. Then, based on similarity between the enterprise from which a request for a loan is received and the fellow trader, the evaluation unit 133 evaluates credit of the enterprise from which a request for a loan is received. In such a manner, the evaluation unit 133 can employ not only information of the enterprise but also information of a fellow trader with a similar size as an index related to evaluation of credit. Thus, credit can be evaluated more accurately.

Also, by using information related to a trend of a product of the fellow trader or the like, the evaluation unit 133 can evaluate credit of the enterprise from which a request for a loan is received. For example, the evaluation unit 133 determines that a size of a whole industry is increased or that needs from a consumer are increased based on the information related to a business condition of the fellow trader. More specifically, the evaluation unit 133 determines that a degree of attention to the whole industry is increased based on an increase in the number of searches for the fellow trader or an increase in the number of views of a website. In this case, the evaluation unit 133 may determine that growth potential of the enterprise from which a request for a loan is received is promised and may value the credit of the enterprise highly.

4-3. Information Amount

In the above-described embodiment, an example in which the evaluation device 100 evaluates credit of an enterprise based on various kinds of information which can be acquired on the Internet has been described. Here, the evaluation device 100 may evaluate credit of the enterprise by only using what exceeds a certain threshold among information acquired from a general user using various websites.

For example, a review or a user evaluation with respect to a product on a product evaluation site may shows a biased tendency unless the review or the evaluation is based on pieces of data, the number thereof being equal to or larger than a certain value. In this case, the evaluation device 100 may not be able to evaluate credit of an enterprise accurately. Thus, the evaluation device 100 may evaluate credit of the enterprise by using what exceeds a certain value among reviews or user evaluations transmitted from a user. Accordingly, the evaluation device 100 can evaluate credit of the enterprise based on information determined by a relatively large number of users. Thus, reliability of the evaluation can be increased.

4-4. Weighting

When evaluation of credit is performed based on acquired information, the evaluation device 100 may perform weighting based on specific information. For example, the evaluation device 100 determines that a website in which a specialist in a specific field reviews a product is more reliable than an evaluation site on which a post from a general user is received. That is, the evaluation device 100 gives more weight on information related to a review or user evaluation of a product on the website where a specialist reviews the product than information which can be acquired from a general different site and evaluates credit of the enterprise. Accordingly, the evaluation device 100 can evaluate credit of the enterprise accurately.

4-5. Loan

In the above-described embodiment, an example in which the calculation unit 134 calculates a financeable amount based on the credit evaluated by the evaluation unit 133 in the evaluation device 100 has been described. However, the evaluation device 100 does not necessarily calculate a financeable amount. That is, the evaluation device 100 can notify, to a financial institution, only information related to the credit evaluated by the evaluation unit 133. Then, the financial institution calculates a financeable amount based on the notified credit of the enterprise. In this case, the evaluation device 100 may not include the calculation unit 134.

4-6. Enterprise to Make Request for Loan

In the above-described embodiment, an enterprise to make a request to the financial institution server 30 for a loan may be an enterprise which opens a store on a comprehensive shopping site on a network managed by the evaluation device 100. Here, the web server 40 from which the evaluation device 100 acquires information such as user behavior is a server to manage the shopping site where the store is opened by the enterprise. In this case, the evaluation device 100 can directly acquire, from the web server 40, information such as purchasing behavior of a user using the shopping site or the like operated by the enterprise. Thus, reliable information can be easily acquired as information used for evaluation processing. Thus, the evaluation device 100 can evaluate credit more accurately. Also, in this case, the evaluation device 100 may share information, which is transmitted from the user terminal 10, with the web server 40 instead of acquiring information from the web server 40. For example, the evaluation device 100 may share, with the web server 40, information accumulated in an external storage server or the like managed by an administrator who also manages the evaluation device 100.

4-7. Regression Analysis

By performing a regression analysis with respect to an index value indicated by a variable number (such as the number of searches, ranking of product evaluation, or the number of users of product) and financial information of an enterprise among the information acquired by the acquisition unit 132, the evaluation unit 133 can evaluate credit of an enterprise. That is, the evaluation unit 133 evaluates credit of the enterprise based on a correlation between the index value and the financial information which correlation is acquired by performance of the regression analysis of the acquired index value and financial information. For example, the evaluation unit 133 sets each index value as a dependent variable and financial information of the enterprise (such as operating profit or sales amount in predetermined period) as an independent variable and performs the regression analysis, whereby a predetermined regression equation is calculated. Accordingly, the evaluation unit 133 can analyze, for example, correlation of variation in the financial information of the enterprise with each index value. In such a manner, since the evaluation unit 133 can associate the acquired information with the financial information, credit can be evaluated more accurately. Note that for example, the acquisition unit 132 acquires the financial information of the enterprise from the cooperate finance data 52 or the like held by the company data provider 50.

4-8. Similar Enterprise

Also, the acquisition unit 132 may acquire a financial condition of a similar enterprise which is an enterprise determined to be similar to an enterprise because of a similarity in information indicated by an index value such as the number of searches. For example, the acquisition unit 132 determines that an enterprise with a similar search tendency, a similar tendency of a product evaluation, or a similar enterprise size is an enterprise similar to an enterprise to be evaluated even when the enterprise is not a fellow trader of the enterprise to be evaluated. Then, the acquisition unit 132 acquires information of the similar enterprise. Then, the evaluation unit 133 evaluates credit of the enterprise based on a financial condition of the similar enterprise which condition is acquired by the acquisition unit 132. In such a manner, the evaluation device 100 can set, as an index of evaluation, a financial condition of an enterprise with a similar size or in a similar industry with the enterprise to be evaluated. Thus, credit can be evaluated more accurately.

Note that for example, the acquisition unit 132 acquires financial information of the similar enterprise from the cooperate finance data 52 or the like held by the company data provider 50.

4-9. Other

Also, all or a part of the processing described to be performed automatically among the processing described in the above-described embodiment can be performed manually. Alternatively, all or a part of the processing described to be performed manually can be performed automatically by a well-known method. Also, a processing procedure, a specific name, and information including various kinds of data or parameters which procedure, name, and information are described in the document or illustrated in the drawings can be changed arbitrarily when not being noted specifically.

Also, each configuration element of each illustrated device is function-conceptual and is not necessarily configured physically in a manner illustrated in the drawings. That is, a detail form of separation/integration of each device is not limited to what is illustrated and all or a part thereof can be configured in a manner functionally or physically separated/integrated in an arbitrary unit according to various loads or utilization conditions.

For example, the search information storage unit 121, the site information storage unit 122, the product information storage unit 123, the social information storage unit 124, and the customer information storage unit 125 which are illustrated in FIG. 2 may not be held by the evaluation device 100 and may be held by a storage server or the like. In this case, the evaluation device 100 acquires various kinds of stored information by accessing the storage server.

Also, for example, the above-described evaluation device 100 may be separated into a side of a front-end server, which executes an exchange with an external device and which, for example, receives a request related to an evaluation of an enterprise or notifies a financeable amount, and a side of a back-end server which acquires information on the Internet or executes evaluation processing or the like.

5. Hardware Configuration

Figure 9:
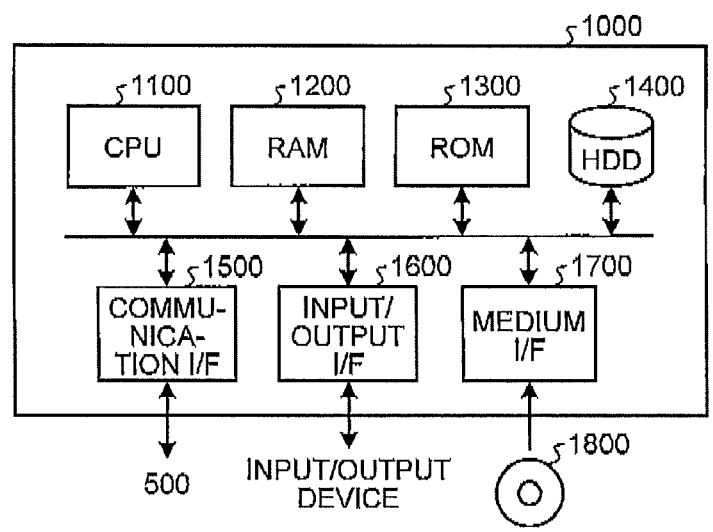
FIG. 9 is a hardware configuration view illustrating an example of a computer which realizes a function of the evaluation device.

Also, the evaluation device 100 according to the above-described embodiment is realized by a computer 1000 having a configuration illustrated, for example, in FIG. 9. FIG. 9 is a hardware configuration view illustrating an example of the computer 1000 to realize a function of the evaluation device 100. The computer 1000 includes a CPU 1100, a RAM 1200, a ROM 1300, an HDD 1400, a communication interface (I/F) 1500, an input/output interface (I/F) 1600, and a medium interface (I/F) 1700.

The CPU 1100 operates based on a program stored in the ROM 1300 or the HDD 1400 and controls each unit. The ROM 1300 stores a boot program executed by the CPU 1100 in activation of the computer 1000, a program depending on hardware of the computer 1000, and the like.

The HDD 1400 stores a program executed by the CPU 1100, data used by the program, and the like. The communication interface 1500 receives data from a different device through a communication network 500 (corresponding to communication network in embodiment) and transmits the data to the CPU 1100. Also, the communication interface 1500 transmits data generated by the CPU 1100 to a different device through the communication network 500.

The CPU 1100 controls an output device such as a display or a printer and an input device such as a keyboard or a mouse through the input/output interface 1600. The CPU 1100 acquires data from the input device through the input/ output interface 1600. Also, the CPU 1100 outputs the generated data to the output device through the input/output interface 1600.

The medium interface 1700 reads the program or data stored in a recording medium 1800 and provides the program or data to the CPU 1100 through the RAM 1200. The CPU 1100 loads the program from the recording medium 1800 into the RAM 1200 through the medium interface 1700 and executes the loaded program. The recording medium 1800 is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 functions as the evaluation device 100, the CPU 1100 of the computer 1000 realizes a function of the control unit 130 by executing the program loaded into the RAM 1200. Also, the HDD 1400 stores each piece of data in the storage unit 120. The CPU 1100 of the computer 1000 reads the program from the recording medium 1800 and executes the program. However, in a different example, the program may be acquired from a different device through the communication network 500.

6. Effect

As described above, the evaluation device 100 according to the embodiment includes the acquisition unit 132 which acquires information related to an enterprise among information based on user behavior on a communication network such as the Internet and the evaluation unit 133 which evaluates credit of the enterprise based on the information acquired by the acquisition unit 132.

In such a manner, the evaluation device 100 according to the embodiment evaluates credit of an enterprise based not on financial information or the like of a company, which information is generally used by a financial institution, but on user behavior on a network. For example, by acquiring information on the Internet, the evaluation device 100 can evaluate an enterprise based on instantaneous information. Thus, according to the evaluation device 100, it is also possible to accurately evaluate credit of a new enterprise or a small enterprise financial information or the like of which is not accumulated adequately and credit of which cannot be generally evaluated.

Also, the acquisition unit 152 acquires, as information based on user behavior on the Internet, information transmitted from a user in utilization of a service provided by various websites.

In such a manner, the evaluation device 100 can acquire various kinds of information on each web service. Thus, not-biased information can be acquired as information related to an enterprise. Accordingly, the evaluation device 100 can prevent evaluation from being biased to specific information with respect to credit of an enterprise.

Also, the acquisition unit 132 acquires, as information based user behavior on the Internet, at least one of the number of searches with a search query related to an enterprise, search ranking, and a rate of variation in the number of searches in each predetermined period. Then, the evaluation unit 133 evaluates a degree of credit based on a value indicated by at least one of the number of searches, the search ranking, and the rate of variation in the number of searches in each predetermined period acquired by the acquisition unit 132.

In such a manner, by analyzing search information, the evaluation device 100 can determine a degree of attention from a general user with respect to an enterprise to be evaluated. Accordingly, since the evaluation device 100 can evaluate business continuity or growth potential of the enterprise, credit can be evaluated more accurately.

Also, the acquisition unit 132 acquires, as information based on user behavior on the Internet, at least one of the number of views, the number of viewers, and a conversion rate on a website provided by the enterprise. Then, the evaluation unit 133 evaluates a degree of credit based on a value indicated by at least one of the number of views, the number of viewers, and the conversion rate acquired by the acquisition unit 132.

In such a manner, by analyzing information related to a website provided by an enterprise, the evaluation device 100 can determine an interest of a general user with respect to the enterprise to be evaluated. Accordingly, since the evaluation device 100 can evaluate business continuity or growth potential of the enterprise, credit can be evaluated more accurately.

Also, the acquisition unit 132 acquires, as information based on user behavior on the Internet, at least one of an evaluation value from a user with respect to a product provided by an enterprise, the number of users of the product, and the number of reviews posted with respect to the product. Then, the evaluation unit 133 evaluates a degree of credit based on a value indicated by at least one of the evaluation value from a user with respect to a product provided by an enterprise, the number of users of the product, and the number of reviews posted with respect to the product which are acquired by the acquisition unit 132.

In such a manner, by analyzing information related to a product provided by an enterprise, the evaluation device 100 can acquire information related to an evaluation by a general user with respect to the enterprise (or provided product). Accordingly, the evaluation device 100 can evaluate business continuity, growth potential, or the like of the enterprise. Also, since an evaluation by a general user is reflected instantly on a site related to an evaluation of a product or the like, the evaluation device 100 can directly acquire a response to an enterprise from the general user. Thus, the evaluation device 100 can evaluate credit more accurately.

Also, when a product provided by an enterprise is a program product such as an application, the acquisition unit 132 acquires an index value of at least one of the number of downloads of an application, the number of users, average utilization time of each user, and an operation rate in a predetermined period or a rate of variation of an index value in a predetermined period. Then, the evaluation unit 133 evaluates a degree of credit based on the index value or the rate of variation of the index value in the predetermined period which value or rate is acquired by the acquisition unit 132.

Accordingly, the evaluation device 100 can evaluate business continuity, growth potential, or the like of the enterprise. Also, the evaluation device 100 can set, as an index value for evaluation of credit, a real-time response from a user posted to an application store or the like.

Also, the acquisition unit 132 acquires, as information based on user behavior on the Internet, at least one of the number of customers of an enterprise, a continuous utilization rate of a customer, and a unit price of a customer. Then, the evaluation unit 133 evaluates a degree of credit based on a value indicated by at least one of the number of customers, the continuous utilization rate of a customer, and the unit price of a customer acquired by the acquisition unit 132.

In such a manner, the evaluation device 100 can estimate a business condition of an enterprise by analyzing information related to a customer of the enterprise. Accordingly, since the evaluation device 100 can evaluate a probability of bankruptcy, business continuity, or the like of an enterprise, credit can be evaluated more accurately.

The acquisition unit 132 acquires financial information of an enterprise. Then, the evaluation unit 133 evaluates a degree of credit based on a correlation between an index value and the financial information of the enterprise which correlation is acquired by a regression analysis of at least one of index values acquired by the acquisition unit 132 and the financial information of the enterprise.

In such a manner, since the evaluation device 100 can analyze the acquired information and financial information while associating the two to each other, credit can be evaluated more accurately.

Also, the acquisition unit 132 acquires financial information of a similar enterprise which is an enterprise determined to be similar to an enterprise because of a similarity in information indicated by an index value such as the number of searches. Then, the evaluation unit 133 evaluates credit of the enterprise based on the financial information of the similar enterprise acquired by the acquisition unit 132.

In such a manner, the evaluation device 100 can set, as an index of evaluation, financial information of an enterprise with a similar size or in a similar industry with an enterprise to be evaluated. Thus, credit can be evaluated more accurately.

Also, the acquisition unit 132 acquires, as information based on user behavior on the Internet, information of at least one of an owner, an executive, an employee, and a member of an enterprise using a web service (such as SNS) for construction of a social network.

In such a manner, by acquiring information related to a social connection of the enterprise, the evaluation device 100 can estimate a business condition of the enterprise. Accordingly, since the evaluation device 100 can evaluate growth potential or the like of the enterprise, credit can be evaluated more accurately.

Also, the acquisition unit 132 acquires information related to at least one of popularity, reputation, and a personal connection among information related to an enterprise and information related to an owner, an executive, an employee, and a member of the enterprise in a web service for construction of a social network.

In such a manner, based on information which can be acquired on the Internet, the evaluation device 100 can acquire, as an evaluation index, a personal connection or the like of an owner or an executive which connection does not appear on a financial condition or the like. Accordingly, since the evaluation device 100 can evaluate growth potential or the like of the enterprise, credit can be evaluated more accurately.

Also, the acquisition unit 132 acquires information related to a fellow trader of an enterprise to be evaluated. Then, the evaluation unit 133 evaluates credit of the enterprise to be evaluated based on the information related to the fellow trader which information is acquired by the acquisition unit 132.

In such a manner, the evaluation device 100 acquires not only information related to an enterprise to be evaluated but also that related to a fellow trader. Accordingly, the evaluation device 100 can expand information to be an index of an evaluation of credit, for example, into a size or a tendency of a whole industry. Thus, the credit can be evaluated more accurately.

Also, a configuration of the above-described evaluation device 100 can be changed flexibly. For example, the evaluation device 100 may be realized by a plurality of server computers or may be realized, depending on a function, by calling up an external platform or the like by an application programming interface (API) or network computing.

Also, a "unit" described in claims can be also referred to as "means," a "circuit," or the like. For example, an evaluation unit can be referred teas evaluation means or an evaluation circuit.

According to an embodiment, credit of an enterprise can be evaluated accurately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An evaluation device comprising:
a network interface configured to communicate over a communication network; and
a processor operatively connected to the network interface, the processor being programmed to:
upon receiving, via the network interface, a request for a loan from an enterprise terminal through a financial institution server, the enterprise terminal being an information processing device used by an enterprise, and the financial institution server being a server used by a financial institution:
determine whether a company data provider has enough useful company information related to the enterprise to make a determination regarding the request for the loan; and
responsive to the company data provider not having enough useful company information related to the enterprise to make the determination regarding the request for the loan:
automatically acquire, via the network interface, behavior information on the Internet, the behavior information on the Internet being information transmitted to a web server from a user terminal connected to the Internet, the behavior information being related to the enterprise by evaluating behavior of a plurality of users on the Internet in relation to the enterprise or a product provided by the enterprise, the behavior information on the Internet including information related to one or more Internet actions, including at least one of: (i) a number of times one or more users performed a search using a name of the enterprise, (ii) a number of times one or more users performed a search using a name of a product provided by the enterprise, (iii) a number of times one or more users visited a website associated with the enterprise, and (iv) a number of times one or more users posted a positive review of the enterprise;
responsive to the number of searches related to the enterprise being above a first threshold: assume that a degree of attention paid to the enterprise from a general user is high and that business continuity is well, and determine that a business continuity score for the enterprise is high;
responsive to determining that an increase in the number of visits on the website or based on the number of posts of reviews or high evaluations is above a second threshold: assume that possibility of growth of the enterprise is high and determine that a growth potential score is high;

determine a numerical expression of credit for the enterprise based at least in part on the determined growth potential score and the determined business continuity score of the enterprise; and transmit, via the communication interface to the financial institution server, a notification of the numerical expression of credit in association with information identifying the enterprise.

2. The evaluation device according to claim 1, wherein the processor is further programmed to:

evaluate at least one of a search ranking for searches using the name of the enterprise, and a rate of variation in the number of searches using the name of the enterprise in a predetermined period; and determine the numerical expression of credit for the enterprise based at least in part on an index value indicated by the at least one of the search ranking and the rate of variation in the number of searches.

3. The evaluation device according to claim 1, wherein the processor is further programmed to:

evaluate at least one of the number of users that visited the website associated with the enterprise, and a conversion rate on the website associated with the enterprise; and determine the numerical expression of credit for the enterprise based at least in part on an index value indicated by the at least one of the number of users that visited the website associated with the enterprise and the conversion rate on the website associated with the enterprise.

4. The evaluation device according to claim 1, wherein the processor is further programmed to:

evaluate a number of users of the product provided by the enterprise; and determine the numerical expression of credit for the enterprise based on an index value indicated by the number of users of the product provided by the enterprise.

5. The evaluation device according to claim 4, wherein the processor is further programmed to:

evaluate at least one of a number of downloads of a program product related to the enterprise, a number of users of the program product, an average utilization time of the program product of each user, and an operation rate of the program product in a predetermined period; and determine the numerical expression of credit for the enterprise based on an index value indicated by the at least one of the number of downloads of the program product related to the enterprise, the number of users of the program product, the average utilization time of the program product of each user, and the operation rate of the program product in the predetermined period.

6. The evaluation device according to claim 1, wherein the processor is further programmed to:

evaluate at least one of a number of customers of the enterprise, a continuous utilization rate of a customer of the enterprise, and a unit price of a customer of the enterprise; and determine the numerical expression of credit for the enterprise based on an index value indicated by the at least one of the number of customers of the enterprise, the continuous utilization rate of the customer of the enterprise, and the unit price of the customer of the enterprise.

7. The evaluation device according to claim 2, wherein the processor is programmed to:

acquire financial information of the enterprise; and determine the numerical expression of credit based on a correlation between the index value and the acquired financial information of the enterprise.

8. The evaluation device according to claim 2, wherein the processor is programmed to:

acquire financial information of a similar enterprise, the similar enterprise having a similarity in information indicated by the index value; and determine the numerical expression of credit for the enterprise based on the acquired financial information of the similar enterprise.

9. The evaluation device according to claim 1, wherein the processor is further programmed to:

evaluate social network behavior of at least one of an owner of the enterprise, an executive of the enterprise, an employee of the enterprise, and a member of the enterprise; and determine the numerical expression of credit for the enterprise based on the evaluated social network behavior.

10. The evaluation device according to claim 1, wherein the processor is programmed to:

acquire information related to a similar enterprise; and determine the numerical expression of credit for the enterprise based on the acquired information related to the similar enterprise.

11. An evaluation method executed by a computer, comprising:

upon receiving, via a network interface, a request for a loan from an enterprise terminal through a financial institution server, the enterprise terminal being an information processing device used by an enterprise, and the financial institution server being a server used by a financial institution:

determining whether a company data provider has enough useful company information related to the enterprise to make a determination regarding the request for the loan; and responsive to the company data provider not having enough useful company information related to the enterprise to make the determination regarding the request for the loan:

automatically acquiring, via the network interface, behavior information on the Internet, the behavior information on the Internet being information transmitted to a web server from a user terminal connected to the Internet, the behavior information being related to the enterprise by evaluating behavior of a plurality of users on the Internet in relation to the enterprise or a product provided by the enterprise, the behavior information on the Internet including information related to one or more Internet actions, including at least one of: (i) a number of times one or more users performed a search using a name of the enterprise, (ii) a number of times one or more users performed a search using a name of a product provided by the enterprise, (iii) a number of times one or more users visited a website associated with the enterprise, and (iv) a number of times one or more users posted a positive review of the enterprise;

responsive to the number of searches related to the enterprise being above a first threshold: assuming that a degree of attention paid to the enterprise from a general user is high and that business continuity is well, and determine that a business continuity score for the enterprise is high;

responsive to determining that an increase in the number of visits on the website or based on the number of posts of reviews or high evaluations is above a second threshold: assuming that possibility of growth of the enterprise is high and determine that a growth potential score is high;

determining a numerical expression of credit for the enterprise based at least in part on the determined growth potential score and the determined business continuity score of the enterprise; and transmitting, via the communication interface to the financial institution server, a notification of the numerical expression of credit in association with information identifying the enterprise.

12. A non-transitory computer readable storage medium having stored therein an evaluation program, the evaluation program, when executed by a computer, causing the computer to:

upon receiving, via a network interface, a request for a loan from an enterprise terminal through a financial institution server, the enterprise terminal being an information processing device used by an enterprise, and the financial institution server being a server used by a financial institution:

determine whether a company data provider has enough useful company information related to the enterprise to make a determination regarding the request for the loan; and responsive to the company data provider not having enough useful company information related to the enterprise to make the determination regarding the request for the loan:

automatically acquire, via the network interface, behavior information on the Internet, the behavior information on the Internet being information transmitted to a web server from a user terminal connected to the Internet, the behavior information being related to the enterprise by evaluating behavior of a plurality of users on the Internet in relation to the enterprise or a product provided by the enterprise, the behavior information on the Internet including information related to one or more Internet actions, including at least one of: (i) a number of times one or more users performed a search using a name of the enterprise, (ii) a number of times one or more users performed a search using a name of a product provided by the enterprise, (iii) a number of times one or more users visited a website associated with the enterprise, and (iv) a number of times one or more users posted a positive review of the enterprise;

responsive to the number of searches related to the enterprise being above a first threshold: assume that a degree of attention paid to the enterprise from a general user is high and that business continuity is well, and determine that a business continuity score for the enterprise is high;

responsive to determining that an increase in the number of visits on the website or based on the number of posts of reviews or high evaluations is above a second threshold: assume that possibility of growth of the enterprise is high and determine that a growth potential score is high;

determine a numerical expression of credit for the enterprise based at least in part on the determined growth potential score and the determined business continuity score of the enterprise; and transmit, via the communication interface to the financial institution server, a notification of the numerical expression of credit in association with information identifying the enterprise.

* * * * *